(12) United States Patent
Yokoi (10) Patent No.: US 10,286,870 B2
(45) Date of Patent: May 14, 2019

(54) AIRBAG BASE FABRIC, AIRBAG AND METHOD OF MANUFACTURING AIRBAG BASE FABRIC

(71) Applicant: Toray Industries, Inc., Tokyo (JP)

(72) Inventor: Daisuke Yokoi, Osaka (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/744,213

(22) PCT Filed: Jul. 11, 2016

(86) PCT No.: PCT/JP2016/070443
§ 371 (c)(1),
(2) Date: Jan. 12, 2018

(87) PCT Pub. No.: WO2017/010458
PCT Pub. Date: Jan. 19, 2017

(65) Prior Publication Data
US 2018/0208147 A1    Jul. 26, 2018

(30) Foreign Application Priority Data
Jul. 13, 2015    (JP) .................................. 2015-139988

(51) Int. Cl.
*D03D 1/02*    (2006.01)
*B60R 21/235*    (2006.01)
(Continued)

(52) U.S. Cl.
CPC ............. *B60R 21/235* (2013.01); *D03D 1/02* (2013.01); *D06C 3/10* (2013.01); *D06L 1/12* (2013.01);
(Continued)

(58) Field of Classification Search
CPC .......... A61K 35/17; B60R 2021/23514; B60R 2021/23533; B60R 21/235; D03D 1/02;
(Continued)

(56) References Cited

U.S. PATENT DOCUMENTS

2011/0036447 A1    2/2011 Horiguchi et al.
2012/0225229 A1    9/2012 Ise
(Continued)

FOREIGN PATENT DOCUMENTS

JP    2002-266161 A    9/2002
JP    2011-202340 A    10/2011
(Continued)

*Primary Examiner* — Arti Singh-Pandey
(74) *Attorney, Agent, or Firm* — DLA Piper LLP (US)

(57) ABSTRACT

An airbag base fabric having a warp direction energy absorption characteristic defined by formula (1) is 30 to 50 and a weft direction energy absorption characteristic defined by formula (2) is 30 to 50:

Warp Direction Energy Absorption
  Characteristic=Warp Direction Energy Absorption Amount/Warp Yarn Cover Factor    (1)

wherein the warp direction energy absorption amount is a value of integral of stress applied, in measurement of the warp direction tensile strength and elongation at break, from a start of the measurement until the sample breaks; and Weft Direction Energy Absorption
  Characteristic=Weft Direction Energy Absorption Amount/Weft Yarn Cover Factor    (2)

wherein the weft direction energy absorption amount is a value of the integral of stress applied, in measurement of the weft direction tensile strength and elongation at break, from the start of the measurement until the sample breaks.

8 Claims, 2 Drawing Sheets

(51) Int. Cl.
*D06C 3/10* (2006.01)
*D06L 1/12* (2006.01)
*D06N 3/00* (2006.01)
*D06N 3/12* (2006.01)

(52) U.S. Cl.
CPC .......... *D06N 3/0006* (2013.01); *D06N 3/128* (2013.01); *B60R 2021/23514* (2013.01); *B60R 2021/23533* (2013.01); *D03D 2700/0133* (2013.01); *D10B 2331/02* (2013.01); *D10B 2401/061* (2013.01); *D10B 2505/124* (2013.01)

(58) Field of Classification Search
CPC .... D03D 2700/0133; D06C 3/10; D06L 1/12; D06N 3/0006; D06N 3/128; D10B 2331/02; D10B 2401/061; D10B 2505/124
See application file for complete search history.

(56) References Cited

U.S. PATENT DOCUMENTS

| | | |
|---|---|---|
| 2012/0231273 A1 | 9/2012 | Horiguchi et al. |
| 2013/0147170 A1 | 6/2013 | Tanaka et al. |
| 2014/0106098 A1 | 4/2014 | Ise |
| 2015/0336530 A1 | 11/2015 | Tanaka et al. |
| 2018/0086300 A1* | 3/2018 | Yamada ................ B60R 21/235 |

FOREIGN PATENT DOCUMENTS

| | | |
|---|---|---|
| WO | 2009/113325 A1 | 9/2009 |
| WO | 2012/026455 A1 | 3/2012 |
| WO | 2014/115864 A1 | 7/2014 |

* cited by examiner

AIRBAG BASE FABRIC, AIRBAG AND METHOD OF MANUFACTURING AIRBAG BASE FABRIC

TECHNICAL FIELD

This disclosure relates to an airbag base fabric, an airbag and a method of manufacturing the airbag base fabric. Specifically, the disclosure relates to a base fabric having an excellent energy absorption characteristic, an airbag and a method of manufacturing the airbag base fabric.

BACKGROUND

In recent years, various types of airbags have been developed and put into practical use to ensure occupant safety from motor vehicle accidents. An airbag inflate and deploy in an extremely short time from a moment of a vehicle collision, receives an occupant, and absorbs an impact to protect the occupant. Base fabric for airbag needs to have excellent mechanical properties to inflate and deploy. For example, a side airbag, which is stored in a seat and protects the waist and chest of an occupant during a lateral collision accident, needs to have not only a function as a barrier preventing a deformed door and other things from hitting the occupant, but also a function to receive motion of the waist and chest of the occupant due to a reaction force of a collision, at the same time.

To meet performance requirements for an airbag base fabric, for example, WO 2012/026455 A1 suggests an airbag base fabric intended to have a higher airtight performance with reduced air permeability, a faster deployment speed, and improved impact absorption for protecting an occupant. Also, JP 2002-266161 A suggests a fabric airbag intended to have low air permeability, high flexibility, and excellent compactness and also have high shock-absorbing ability, using a raw yarn having flexibility and high toughness. In addition, JP 2011-202340 A suggests a fabric for an airbag intended to provide a light-weighted airbag module developing without loss of a gas.

In recent years, the demand for better shock absorption property of airbag base fabric has been increasing to cope with various types of collisions and a high-speed collision. Especially in an accident involving severe deformation of a vehicle body and to protect a heavyweight occupant, airbag base fabric needs to absorb large collision energy more efficiently. However, the airbag base fabrics described in WO '455, JP '161 and JP '340 may not absorb such large energy sufficiently. It could therefore be helpful to provide an airbag base fabric capable of absorbing collision energy sufficiently, an airbag and a method of manufacturing the airbag base fabric.

SUMMARY

I found that when energy absorption characteristics, which can be obtained by dividing the warp direction and weft direction energy absorption amounts by cover factors, are in a predetermined range, an improved airbag base fabric can be obtained.

I thus provide:

An airbag base fabric has a warp direction energy absorption characteristic defined by formula (1) is 30 to 50 and a weft direction energy absorption characteristic defined by formula (2) is 30 to 50:

Warp Direction Energy Absorption Characteristic=Warp Direction Energy Absorption Amount/Warp Yarn Cover Factor (1)

wherein the warp direction energy absorption amount is a value of the integral of stress applied, in measurement of the warp direction tensile strength and elongation at break, from the start of the measurement until the sample breaks; and Weft Direction Energy Absorption Characteristic=Weft Direction Energy Absorption Amount/Weft Yarn Cover Factor (2)

wherein the weft direction energy absorption amount is a value of the integral of stress applied, in measurement of the weft direction tensile strength and elongation at break, from the start of the measurement until the sample breaks.)

Also, the airbag may have an airbag base fabric that is sewn.

A method of manufacturing an airbag base fabric comprises a scouring process that scours a woven gray fabric by applying a tension of 150 to 400 N/m with water at 70° C. or less, a drying process that dries the gray fabric at a temperature of 140° C. or less, and a heat-setting process that heat-sets the woven gray fabric, wherein the heat-setting process is a process in which tentering is performed, by using a pin stenter dryer, to obtain a base fabric width more than 98% of a width of the gray fabric dried by a dryer, with an overfeed ratio of −2 to +2%, at a temperature of 120 to 200° C.

REFERENCE SIGNS LIST

1: bag body
2, 3: circular sample
2a, 2b: holes
4: sewing line
L1, L2: stress-strain lines
R: value of the integral of stress

DETAILED DESCRIPTION

Base Fabric for Airbag

The airbag base fabric may be characterized in that a warp energy absorption characteristic direction defined in formula (1) is 30-50 and a weft energy absorption characteristic defined in the below formula (2) is 30-50. Such airbag base fabric can be applied to various types of airbag mounting portions (such as a driver seat. a passenger seat, a side airbag, and a curtain airbag) as an airbag. The airbag can absorb collision energy in various types of collisions because it is made of an airbag base fabric having the above energy absorption characteristic. The following are detailed descriptions.

$$\text{Warp Direction Energy Absorption Characteristic} = \text{Warp Direction Energy Absorption Amount/Warp Yarn Cover Factor} \quad (1)$$

In formula (1), the warp direction energy absorption amount is a value of the integral of stress applied, in measurement of the warp direction tensile strength and elongation at break, from the start of the measurement until the sample breaks.

$$\text{Weft Direction Energy Absorption Characteristic} = \text{Weft Direction Energy Absorption Amount/Weft Yarn Cover Factor} \quad (2)$$

In formula (2), the weft direction energy absorption amount is a value of the integral of stress applied, in measurement of the weft direction tensile strength and elongation at break, from the start of the measurement until the sample breaks.

Definition of Energy Absorption Characteristic

Figure 1:
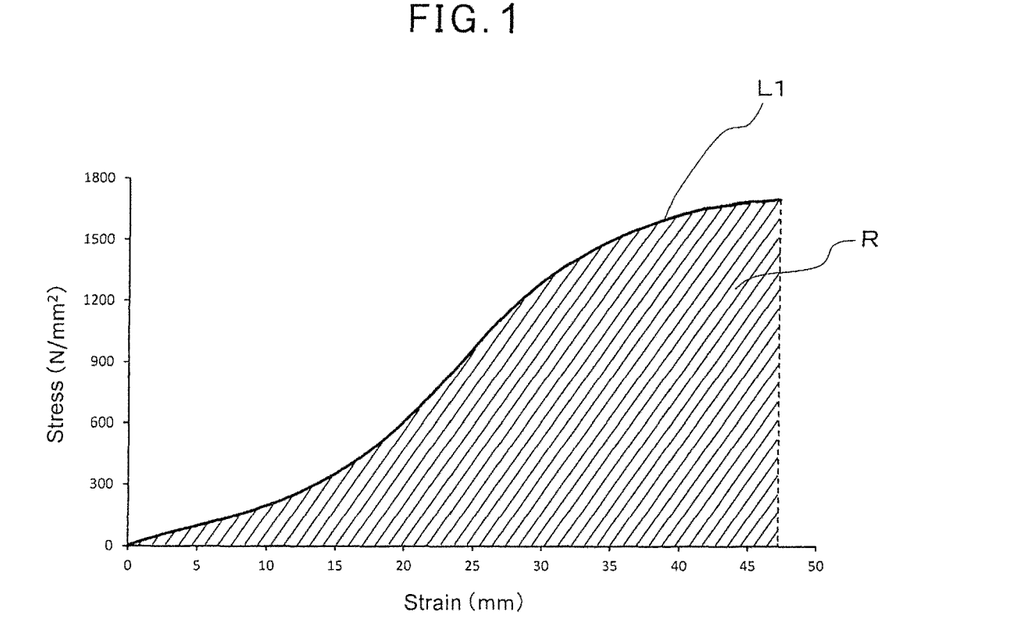
FIG. 1 is a graph showing a warp direction stress-strain curve obtained from measurement of tensile strength and elongation at break of the airbag base fabric of Example 1.

First, the definition of the energy absorption characteristic is explained in detail by referring to FIG. 1. The energy absorption characteristic may be a parameter calculated by dividing an energy absorption amount measured in the warp and weft directions respectively by a cover factor calculated in the warp and weft directions respectively. FIG. 1 is a graph showing a warp direction stress-strain curve L1 obtained from measurement of tensile strength and elongation at break of the airbag base fabric of the below-mentioned Example 1. The stress-strain curve L1 can be obtained by measuring the tensile strength and the elongation at break in accordance with JIS L 1096: 2010 8.14 Method A (the Strip Method), described below. In FIG. 1, the abscissa represents the strain (mm) and the ordinate represents the stress (N/mm$^2$). As the tensile strength and the elongation at break are measured, stress at each point in time is measured every predetermined period of time, from the beginning of the measurement to the moment when a sample breaks. The stress-strain curve L1 is a curve obtained by plotting values of the stress measured every predetermined period of time and connecting the plotted values of the stress.

Warp Direction Energy Absorption Amount

The warp direction energy absorption amount is represented as an area of halftone dot meshing shown in FIG. 1 (an area R). The area R is, as shown in formula (1), a value of the integral of stress applied from the beginning of the measurement to a moment when a sample breaks. More specifically, the warp direction energy absorption amount can be calculated, for example, by summing micro areas, calculated in accordance with formula (3), from the origin to the break point. This warp direction energy absorption amount corresponds to an approximate value of the total sum of the stress applied from the beginning of the measurement to a moment when a sample breaks. When a measurement interval is small enough (for example, measurement is made every 50 milliseconds), this approximate value can be practically considered to be the total sum of the stress.

$$\text{Micro Area}(N/\text{mm}) = (n+l\text{th Strain (mm)} - n\text{th Strain (mm)}) \times (n+l\text{th Stress})(N/\text{mm}^2) \quad (3)$$

An nth point is a given measurement point and a n+lth point is a measurement point 50 milliseconds after the nth measurement point. Thus, an n+lth strain (mm) represents a value of strain (mm) at an n+lth measurement point, and an n+lth stress (N/mm$^2$) represents a value of stress (N/mm$^2$) at an n+lth measurement point.

Figure 2:
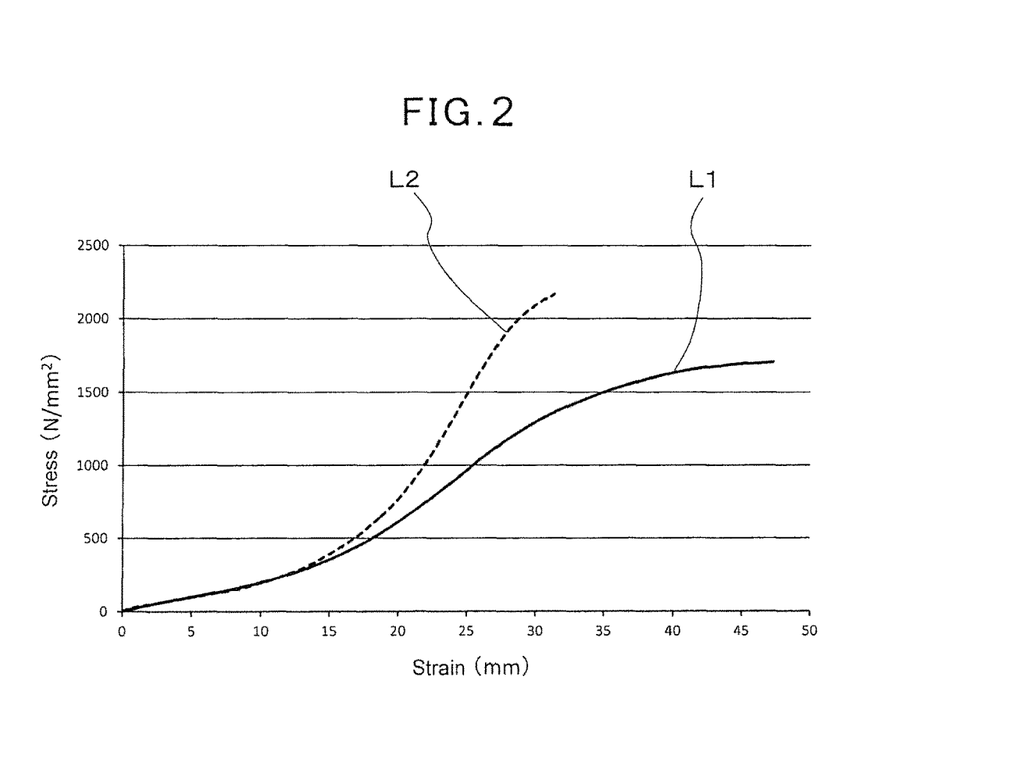
FIG. 2 is a graph showing a warp direction stress-strain curve obtained from measurement of tensile strength and elongation at break of the airbag base fabric of Example 1 and a weft direction stress-strain curve obtained from measurement of tensile strength and elongation at break of the airbag base fabric of Comparative Example 1.

FIG. 2 is a graph showing a warp direction stress-strain curve L1 obtained from measurement of tensile strength and elongation at break of the airbag base fabric of Example 1 and a weft direction stress-strain curve L2 obtained from measurement of tensile strength and elongation at break of the airbag base fabric of Comparative Example 1. As shown in FIG. 2, in the sample, the maximum stress is relatively large and the strain required until the moment of breaking is also large, as can be seen from the stress-strain curve L1. On the other hand, in the sample shown in the stress-strain curve L2, the maximum stress is large and the strain required until the moment of breaking is small. Therefore, the energy absorption amount calculated based on the stress-strain curve L1 is consequently larger than the energy absorption amount calculated based on the stress-strain curve L2. Such large energy absorption amount is important for an airbag to be obtained in coping with various types of collisions.

The weft direction energy absorption amount can be obtained in the same method as the warp direction energy absorption amount. Thus, an overlapping explanation is omitted.

Warp Direction Cover Factor

The warp direction cover factor is a parameter representing a degree of gapping between yarns. In the example, the warp direction cover factor is defined by formula (4). Total fineness can be calculated in accordance with JIS L 1096: 2010 8. 9. 1. 1 Method B. Also, fabric density can be calculated in accordance with JIS L 1096: 2010 8. 6. 1 Method A.

$$\text{Warp Direction Cover Factor} = (\text{Total Fineness of Warp Yarn (dtex)})^{1/2} \text{Fabric Density of Warp (number of yarns/25.4 mm)} \quad (4)$$

Weft direction cover factor can be obtained in the same method as the warp direction cover factor. Thus, an overlapping explanation is omitted.

Warp Direction Energy Absorption Characteristic

As described above, airbags are mounted in various mounting portions (such as a driver seat, a passenger seat, a side airbag, a curtain airbag). In each mounting portion, optimal ranges of total fineness and fabric density of yarns forming an airbag base fabric (also referred to as raveled yarns hereinafter) vary. Thus, the airbag may be characterized not by the degree of the energy absorption amount mentioned above but in that, as shown in formula (1), the warp direction energy absorption characteristic obtained by dividing the warp direction energy absorption amount by the warp yarn cover factor is in a predetermined range. Because the warp direction energy absorption amount per fineness is specified, influence of the total fineness of the warp yarn and the fabric density of the warp on the warp direction energy absorption characteristic can be sufficiently excluded. Consequently, the warp direction energy absorption characteristic can be applied to various mounting portions as well as various types of collisions.

The weft direction energy absorption characteristic, as the warp direction energy absorption characteristic is, can be calculated in accordance with formula (2). Thus, an overlapping explanation is omitted.

The airbag base fabric may have a warp direction energy absorption characteristic of 30 or more. The warp direction energy absorption characteristic is preferably 33 or more, more preferably 35 or more. Also, the warp direction energy absorption characteristic is 50 or less. The warp direction energy absorption characteristic is preferably 45 or less, more preferably 43 or less. Also, the airbag base fabric may have a weft direction energy absorption characteristic of 30 or more. The weft direction energy absorption characteristic is preferably 33 or more, more preferably 35 or more. Also, the weft direction energy absorption characteristic is 50 or less. The weft direction energy absorption characteristic is preferably 45 or less, more preferably 43 or less. When the warp direction and weft direction energy absorption characteristics of the airbag base fabric are 30 to 50, the airbag to be obtained can be mounted to various mounting portions (such as a driver seat, a passenger seat, a side airbag, a curtain airbag) and also can cope with various types of collisions, for example, by receiving a deformed part of a vehicle body and an occupant. On the other hand, if the warp direction and weft direction energy absorption characteristics are less than 30, the cushion is possibly damaged due to stress concentration when the airbag receives a deformed part of a vehicle body and the occupant at the same time. Also, if the warp direction and weft direction energy absorption characteristics are more than 50, the raveled yarns tend to be plastic-deformed and the total fineness tends to be lowered while the airbag is deployed and receiving an occupant. For such case, the airbag base fabric, especially when it is a uncoated airbag base fabric, tends to have high air permeability. Consequently, the inner pressure during deployment tends to be insufficient in the airbag to be obtained.

Next, the properties which the airbag base fabric suitably has are explained.

Elongation at Break of Airbag Base Fabric

For the airbag base fabric, the warp direction elongation at break is preferably 35% or more, more preferably 44% or more, further preferably 45% or more. Also, the warp direction elongation at break is preferably 55% or less, more preferably 50% or less, further preferably 48% or less. On the other hand, the weft direction elongation at break is preferably 35% or more, more preferably 44% or more, further preferably 45% or more. Also, the weft direction elongation at break is preferably 55% or less, more preferably 50% or less, further preferably 48% or less. In addition, the average of the warp direction elongation at break and the weft direction elongation at break is preferably 35% or more, more preferably 44% or more, further preferably 45% or more. Also, the average of the warp direction elongation at break and the weft direction elongation at break is preferably 55% or less, more preferably 50% or less, further preferably 48% or less. When the warp direction elongation at break, the weft direction elongation at break, or the average of the warp direction elongation at break and the weft direction elongation at break is in the above-mentioned ranges, the airbag to be obtained suitably stretches during deployment. Therefore, the airbag base fabric to be obtained is likely to be made compact, and production costs are likely to be reduced. Also, when a vehicle body is deformed or the airbag to be obtained receives an occupant, stress is less likely to concentrate. As a result, damage to the cushion is likely to be reduced. The elongation at break of the airbag base fabric can be calculated in accordance with JIS L 1096: 2010 8. 14 Method A (the Strip Method).

Mechanical Properties of Raveled Yarns

For the raveled yarns forming the airbag base fabric, both the warp yarn and the weft yarn are preferably multifilament to obtain a base fabric with low air permeability. Also, the warp yarn and the weft yarn are preferably synthetic multifilament yarn because tenacity and elongation of multifilament yarn can be easily in a preferred range.

Total fineness of the warp yarn and the weft yarn are both preferably 145 dtex or more, more preferably 200 dtex or more, further preferably 300 dtex or more. Also, the total fineness of the warp yarn and the weft yarn are both preferably 720 dtex or less, more preferably 600 dtex or less, further preferably 500 dtex or less. When the total fineness of the warp yarn and the weft yarn are in the above-mentioned range, the tensile strength and the tear strength of the airbag base fabric to be obtained are likely to be improved and mechanical properties suitable for the purpose of airbag are likely to be obtained. Also, the airbag to be obtained becomes excellent in compactness and lightness. Especially when the total fineness is 200 dtex or more, or 600 dtex or less, the mechanical properties, and compactness and lightness are likely to be obtained at the same time. It should be noted that the total fineness of the warp yarn and the weft yarn can be calculated in accordance with JIS L 1096: 2010 8. 9. 1. 1 Method B.

When the total fineness of the warp yarn and the weft yarn are same, a smaller single filament fineness means a higher filament count. In this case, in manufacturing processes of the airbag base fabric and during operation of the airbag, the warp yarn and the weft yarn rub against each other and single filaments may be damaged. Similarly, in the measurement of tensile strength and elongation at break of the base fabric, which will be describe below, single filaments may be damaged due to the rubbing of the warp and weft yarns, and the base fabric itself may end up being broken. When that happens, damaged single filaments are broken first, and thus stress will be applied only to non-damaged single filaments. Therefore, when the filament count is low, breaking of single filaments has a greater influence on breaking of the entire base fabric for air bag. Therefore, it is preferable that the single filament fineness, which represents a filament count, is moderately low.

Specifically, single filament fineness of the warp yarn and the weft yarn are both preferably 2 dtex or more, more preferably 3 dtex or more. Also, the single filament fineness of the warp yarn and the weft yarn are preferably 10 dtex or less, more preferably 7 dtex or less, further preferably 5 dtex or less. When the single filament fineness of the warp yarn and the weft yarn are in the above-mentioned range, the airbag base fabric to be obtained can have excellent mechanical properties and energy absorption characteristic. Also, the warp yarn and the weft yarn having such single filament fineness can be easily manufactured to be high strength. Also, the warp yarn and the weft yarn having such single filament fineness have a suitable filament count, and the airbag base fabric to be obtained tends to have high tensile strength, and the mechanical properties and the energy absorption characteristic tends to be improved. In addition, the airbag base fabric to be obtained can have reduced air permeability. The single filament fineness can be calculated by dividing the above-mentioned total fineness by a filament count.

Tenacity of the warp yarn and the weft yarn are both preferably 4.5 cN/dex or more, more preferably 5.0 cN/dex or more, further preferably 5.3 cN/dex or more. Also, the tenacity of the warp yarn and the weft yarn are both preferably 6.5 cN/dex or less, more preferably 6.0 cN/dex or less, further preferably 5.7 cN/dex or less. When the tenacity of the warp yarn and the weft yarn are in the above-mentioned range, it is likely that the airbag base fabric to be obtained exhibits both excellent energy absorption characteristic and mechanical properties. The tenacity of the warp yarn and the weft yarn can be calculated in accordance with JIS L 1013: 2010 8. 5. 1.

Elongation at break of the warp yarn and the weft yarn are both preferably 23% or more, more preferably 30% or more, further preferably 35% or more. Also, the elongation at break of the warp yarn and the weft yarn are both preferably 45% or less, more preferably 40% or less, further preferably 39% or less. When the elongation at break of the warp yarn and the weft yarn are in the above-mentioned range, it is likely that the airbag base fabric to be obtained exhibits both excellent energy absorption characteristic and mechanical properties. Also, in the airbag to be obtained, stress applied by an occupant during deployment tends to be dispersed. The elongation at break of the warp yarn and the weft yarn can be calculated in accordance with JIS L 1013: 2010 8. 5. 1.

The sum of the warp yarn cover factor and the weft yarn cover factor (the total cover factor) is preferably 1900 or more, more preferably 2000 or more, further preferably 2100 or more. Also, the total cover factor is preferably 2400 or less, more preferably 2350 or less, further preferably 2300 or less. When the total cover factor is in the above-mentioned range, the airbag to be obtained is likely to maintain a shape during deployment, have low air permeability, and have excellent mechanical properties.

Raw Material of Warp Yarn and Weft Yarn

A polymer forming the warp yarn and the weft yarn is not particularly limited. For example, the polymer is a polymer which can form polymer array fiber such as homopolymer and copolymer of a polyamide such as nylon 6,6, nylon 6, nylon 12, nylon 5,6, and nylon 6,10 and a polyester such as polyethylene terephthalate, polybutylene terephthalate, and polyethylene naphthalate. Among those, polyamides and polyesters are preferable for the polymer, and polyamides of nylon 6,6 and nylon 6 are more preferable because, with those, impact resistance can be easily provided to the airbag base fabric to be obtained.

When these polymers are used to manufacture the warp yarn and the weft yarn, additives can be added to improve productivity in manufacturing and working processes, and characteristics. Examples of such additives include a heat stabilizer, an antioxidant, a light stabilizer, smoothing agent, an antistatic agent, a plasticizer, a thickener, a pigment, a flame retardant and the like.

Thickness of Airbag Base Fabric

Thickness of the airbag base fabric is preferably thin in terms of compactness. However, to obtain the required mechanical properties, the thickness is preferably 0.15 mm or more, more preferably 0.20 mm or more, further preferably 0.23 mm or more, particularly preferably 0.28 mm or more. Also, the thickness of the airbag base fabric is preferably 0.40 mm or less, more preferably 0.38 mm or less, further preferably 0.34 mm or less. When the thickness of the airbag base fabric is in the above-mentioned range, the airbag to be obtained is, while having the required mechanical properties, sufficiently compact, and thus space in a vehicle can be largely saved.

Total Weight of Airbag Base Fabric

Total weight of the airbag base fabric is preferably low in terms of lightness. However, to obtain the required mechanical properties, the total weight is preferably 120 g/m$^2$ or more, more preferably 150 g/m$^2$ or more, further preferably 170 g/m$^2$ or more. Also, the total weight of the airbag base fabric is preferably 320 g/m$^2$ or less, more preferably 280 g/m$^2$ or less, further preferably 230 g/m$^2$ or less. When the total weight the airbag base fabric is in the above-mentioned range, the airbag to be obtained is, while showing the required mechanical properties, sufficiently light, and thus fuel efficiency of a vehicle can be improved.

Applying Resin Coating or not

The airbag base fabric may be coated or laminated with resin on at least one surface thereof to reduce its air permeability. The resin is not particularly limited as long as it can be coated or laminated on a surface of the gray fabric. Examples of the resin include thermosetting resins such as silicone resin and polyimide resin, thermoplastic resins such as polyamide resin and polyurethane resin, and fluororesins. Among them, thermosetting resins, which can be cured by heating after being coated, are preferable because that allows simultaneous implementation of heat setting of gray fabric and curing of the resin in the process of heat setting which will be described later. Among them, silicone resin is preferable for the resin because it is excellent in heat resistance, aging resistance, and versatility.

A coating amount of the resin coating is expected to be adjusted so that desirable air permeability is obtained. For example, the coating amount is preferably 5 g/m$^2$ or more, more preferably 10 g/m$^2$ or more. Also, the coating amount is preferably 30 g/m$^2$ or less, more preferably 25 g/m$^2$ or less. When the coating amount is in the above-mentioned range, the airbag base fabric to be obtained, while being light-weighted, can be adjusted so that the air permeability is suitably low.

Tensile Strength of Airbag Base Fabric

Tensile strengths of the airbag base fabric are, both in the warp and weft directions, preferably 1000 N/30 mm or more, more preferably 1400 N/30 mm or more, further preferably 1600 N/30 mm or more. Also, the tensile strengths of the airbag base fabric are, both in the warp and weft directions, preferably 2200 N/30 mm or less, more preferably 2000 N/30 mm or less, further preferably 1800 N/30 mm or less. When the tensile strengths are in the above-mentioned range, the airbag base fabric to be obtained is more excellent in the mechanical properties. The tensile strengths of the airbag base fabric can be calculated in accordance with JIS L 1096: 2010 8. 14 Method A (the Strip Method).

Tear Strength of Airbag Base Fabric

Tear strengths of the airbag base fabric are, both in the warp and weft directions, preferably 100N or more, more preferably 110N or more. Also, the tear strengths of the airbag base fabric are, in the warp and weft directions, preferably 300N or less, more preferably 250N or less. When the tear strengths are in the above-mentioned range, the airbag to be obtained is less likely to be torn when stress applied by receiving an occupant or other force is concentrated thereon during deployment. As a result, generation of air holes on the deployed airbag is prevented. The tear strengths of the airbag base fabric can be calculated in accordance with JIS L 1096: 2010 8. 17 Method A (the Single Tongue Method).

Edgecomb Resistance of Airbag Base Fabric

Edgecomb resistances of the airbag base fabric are, both in the warp and weft directions, preferably 200N or more, more preferably 250N or more. Also, the edgecomb resistances of the airbag base fabric are, both in the warp and weft directions, preferably 900N or less, more preferably 800N or less. When the edgecomb resistances are in the above-mentioned range, the airbag to be obtained has smaller yarn slippage at a sewn portion. As a result, in the airbag to be obtained, leaking of heated gas from an inflator is less likely to occur, the inner pressure tends to be maintained, and melting of the base fabric at a sewn portion is prevented. The edgecomb resistances of the airbag base fabric can be calculated in accordance with ASTM D 6479-02.

Stiffness of Airbag Base Fabric

Stiffness of the airbag base fabric is preferably 5N or more, more preferably 7N more, further preferably 9N or more. Also, the stiffness is preferably 25N or less, more preferably 20N or less, further preferably 17N or less. When the stiffness is in the above-mentioned range, the airbag base fabric to be obtained is easy to be sewn. Also, workability is excellent in folding and storing the cushion of the airbag to be obtained. The stiffness of the airbag base fabric can be calculated in accordance with the Circular Bend Method of ASTM D 4032-94.

Air Permeability of Airbag Base Fabric

Air permeability in a pressure difference of 19.6 kPa, which represents the air permeability of the airbag base fabric, preferably 8.0 L/cm$^2$/min or less, more preferably 5.0 L/cm$^2$/min or less, further preferably 3.0 L/cm$^2$/min or less. Also, the air permeability is preferably 0.5 L/cm$^2$/min or more. When the air permeability is in the above-mentioned range, the airbag to be obtained is better in occupant restraint performance during deployment. The air permeability of the airbag base fabric can be calculated in accordance with JIS L 1096: 2010 8.26 Method A (the Fragile Form Method).

Crimp Ratio of Airbag Base Fabric

For crimp ratio of the airbag base fabric, the average of the warp direction and weft direction crimp ratio is preferably 2% or more, more preferably 3% or more, further preferably 4% or more. Also, the average of the crimp ratio is preferably 10% or less, more preferably 7% or less, further preferably 6% or less. When the average of the crimp ratio is maintained in the above range before and after processing of the gray fabric, the tensile strength and the elongation at break are less likely to be degraded during the manufacturing process of the airbag base fabric. As a result, the airbag base fabric to be obtained is likely to maintain a high energy absorption characteristic. Regarding the warp direction and weft direction crimp ratios, when, for example, weaving is performed with a water jet loom, tension of the weft yarn is high at the moment of being inserted, and thus the warp direction crimp ratio tends to be higher than the weft direction crimp ratio. Therefore, after the processing, the warp direction crimp ratio is preferably higher than the weft direction crimp ratio. Specifically, the warp direction crimp ratio is preferably 4.0% or more, more preferably 5.0% or more. Also, the warp direction crimp ratio is preferably 10.0% or less, more preferably 9.0% or less. On the other hand, the weft direction crimp ratio is preferably 1.6% or more, more preferably 2.0% or more. Also, the weft direction crimp ratio is preferably 4.0% or less, more preferably 3.5% or less. The crimp ratio of the airbag base fabric can be calculated in accordance with JIS L 1096: 2010 8. 7 Method B.

The airbag base fabric may have energy absorption characteristics both of which are 30-50. An airbag sewn from such airbag base fabric can sufficiently absorb collision energy in various types of collisions.

Manufacturing Method of Airbag Base Fabric

The manufacturing method of the airbag base fabric is characterized in that a scouring process, a drying process, and a heat setting process are performed on a gray fabric woven in the method illustrated below. Each of those is explained below. The manufacturing method of the airbag base fabric may include any process in addition to the above-mentioned processes. For example, the manufacturing method of the airbag base fabric can include a coating process if a coated base fabric coated with resin is to be manufactured.

Preparation of Gray Fabric

The gray fabric can be obtained by weaving warp yarns and weft yarns with a loom. The warp yarn and the weft yarn to be used (raw yarns) are not particularly limited. For example, the warp yarn and the weft yarn are both synthetic multifilament yarn, having a total fineness of 150-700 dtex, a single filament fineness of 2-10 dtex, a tenacity of 5.0-7.5 cN/dtex, and a elongation at break of 30-50%. When such synthetic multifilament yarn is used, the weft yarn and the warp yarn are preferably of similar multifilament yarn because mechanical properties of the airbag base fabric to be obtained become equal in the warp and weft directions. The term "similar mechanical properties" means that differences in any of the total fineness, single filament fineness, tenacity, and elongation at break are 10% or less.

The fabric density of the warp and the weft depend on the total fineness and the cover factors. For example, the fabric density of the warp and the weft are, when raveled yarn having a total fineness of 470 dtex is used to form the airbag base fabric, preferably 47 threads/2.54 cm or more, more preferably 49 threads/2.54 cm or more. Also, the fabric density of the warp and the weft are, when raveled yarn having a total fineness of 470 dtex is used to form the airbag base fabric, preferably 58 threads/2.54 cm or less, more preferably 57 threads/2.54 cm or less. When the fabric density of the warp and the weft are in the above-mentioned range, there is an advantage that even a uncoated base fabric can maintain low air permeability and high mechanical properties. To obtain an airbag base fabric having equal mechanical properties both in the warp and weft directions, the difference in the fabric density of the warp and the weft is 2.0 threads/2.54 cm or less, more preferably 1.0 threads/2.54 cm or less.

The loom to be used is not particularly limited. The loom can be any of a water jet loom, a rapier loom, an air jet loom, and the like. The loom is preferably a water jet loom because high-speed weaving would be relatively easy.

Fabric texture is not particularly limited. For example, any of plain weave, twill weave, satin weave, and a variation and multiaxial weave of those can be suitably selected for the fabric texture. Among those, plain weave, being excellent in mechanical properties, is preferable for the fabric texture.

A temple device comprised in the loom can be any one of a ring temple which holds a selvedge of gray fabric and a bar temple which holds the entire body of gray fabric. The temple device is preferably a bar temple because it can weave a high-density gray fabric, allowing more stable weft yarn insertion.

A scouring process is performed on the produced gray fabric with a scouring machine.

Scouring Process

The scouring process is a process of decomposing impurities in the gray fabric and making them water soluble so that they can be removed easily. In the scouring process, the gray fabric is, for example, washed by alkaline washing or surfactant washing in a water bath. The scouring machine used in the scouring process is preferably a scouring machine such as an open soaper type and drum type relaxer which can reduce shrinkage in the warp direction with rollers while controlling tension of the gray fabric in the weft direction in the scouring process. Among those, the scouring machine is preferably an open soaper type scouring machine because it can perform scour under a high-tension condition. Also, the scouring machine is preferably a device in which at least 10 rolls may come into contact with one surface of the gray fabric. From this, shrinkage of the gray fabric in the weft direction is likely to be reduced.

The water temperature in each bath inside the scouring machine is expected to be 70° C. or less, preferably 65° C. or less. When the water temperature is over 70° C., the gray fabric is likely to shrink severely, the polymer orientation is disturbed, and the tenacity and the elongation at break of the raveled yarn is likely to be reduced. Also, the water temperature is preferably 30° C. or more, more preferably 40° C. or more. In this condition, a scouring agent tends to be sufficiently activated, and impurities such as oil and wax adhered to the gray fabric are easy to be removed.

The tension applied in the warp direction in a scouring process is expected to be 150 N/m or more, preferably 200 N/m or more. Also, the tension is expected to be 400 N/m or less, preferably 350 N/m or less. When the tension is in the above-mentioned range, the polymer orientation of the gray fabric is less likely to be disturbed and the impurities such as oil and wax can be removed efficiently. When the tension is less than 150 N/m, the gray fabric tends to shrink due to the caused shrinkage force, and the polymer orientation tends to be disturbed. Consequently, the tenacity and the elongation of the raveled yarn may be reduced, and the energy absorption characteristic of the base fabric, which represents a property regarding energy absorption during a collision in various types of collisions, may be reduced. When the tension is over 400 N/m, there would be equipment restrictions on the scouring machine because loads applied to the rolls and its frame become too large.

Drying Process

The drying process is a process of drying the gray fabric after the scouring process. Examples of a dryer to be used in the drying process include a hot air dryer, a suction drum dryer, and a non-touch dryer, and the like. Among them, the dryer is preferably a hot air dryer because the tension of the gray fabric can be made constant easily. Also, the dryer is preferably a device in which at least five rolls may come into contact with one surface of the gray fabric. From this, shrinkage of the gray fabric which can occur in the drying process is likely to be reduced.

The drying temperature is expected to be 140° C. or less, preferably 120° C. or less. When the drying temperature is in the above-mentioned range, strong shrinkage stress on the raveled yarn of the airbag base fabric is less likely to occur. When the drying temperature is over 140° C., the gray fabric tends to shrink due to the occurring shrinkage force, and the polymer orientation tends be disturbed. Consequently, the tensile strength and the elongation of the raveled yarn may be reduced, and the energy absorption characteristic of the base fabric, which represents a property regarding energy absorption at a collision in various types of collisions, also may be reduced. Also, the drying temperature is preferably 80° C. or more, more preferably 100° C. or more. In this condition, the gray fabric is likely to be dried sufficiently.

The tension applied in the warp direction in the drying process is expected to be 150 N/m or more, preferably 200 N/m or more. Also, the tension is expected to be 400 N/m or less, preferably 350 N/m or less. When the tension is in the above-mentioned range, the polymer orientation of the gray fabric is less likely to be disturbed. As a result, the airbag base fabric to be obtained absorbs more collision energy in various types of collisions.

Next, the heat setting process is performed on the dried gray fabric. A coating process may be performed before the heat setting process.

Coating Process

The coating process is suitably applied if a coated base fabric which is coated with resin is to be manufactured. By applying the coating process, the air permeability of the airbag base fabric to be obtained can be reduced. The coating process is an optional process which may be omitted.

A coater to be used in the coating process is not particularly limited. Examples of the coater include a floating knife coater, a roll-on-knife coater, a comma coater, and the like. Among those, a floating knife coater is suitably used because a thin coated base fabric can be manufactured with it. With a floating knife coater, the gray fabric, with a high tension in the weft direction applied, may come into contact with a knife and be coated with resin. From this, a sufficiently light-weighted, thin coated base fabric can be obtained.

The tension in the warp direction applied to the gray fabric is preferably 300 N/m or more. Also, the tension in the warp direction is preferably 2000 N/m or less. When the tension is in the above-mentioned range, a flare at the selvedge caused by unevenness of the gray fabric and the difference in lengths in the longitudinal direction between the opposite ends and the central part of the gray fabric in the width direction (the weft direction) can be smaller, and the resin coating can be more uniform in the width direction.

The resin for coating is not particularly limited. For example, the resin is a silicone resin, a polyamide resin, a polyurethane resin, a fluororesin and the like because they can give heat resistance, cold resistance, flame retardance and the like. Also, the coating amount is not particularly limited. For example, the coating amount is about 5 to 35 g/m$^2$.

Heat Setting Process

The heat setting process is a process of heat setting the gray fabric after the drying process (or after the coating process). In the heat setting process, a pin stenter dryer is used.

Tentering of the gray fabric is performed with a pin stenter dryer to obtain a base fabric width more than 98% of the width of the dried gray fabric. The base fabric width is expected to be 98% or more, and preferably it is set to 99% or more. When the base fabric width is in the above-mentioned range, shrinkage of the gray fabric which can occur in a heat setting process is reduced. Also, the airbag base fabric to be obtained exhibits, in addition to the energy absorption characteristic, both excellent mechanical properties and low air permeability. When the base fabric width is less than 98%, shrinkage tends to occur during the heat setting, the polymer orientation is disturbed, and the tensile strength and the elongation at break tends to be reduced. Also, the airbag base fabric to be obtained tends to have high air permeability. Also, the base fabric width is preferably set to be 100.5% or less, more preferably set to 100% or less. When the base fabric width is set to 100.5% or less, smaller load is applied to a pin of the pin stenter dryer and breaking and bending of the pin are prevented.

In the heat setting process, the overfeed ratio is −2% or more, preferably −1% or more. Also, the overfeed ratio is +2% or less, more preferably +1% or less. When the overfeed ratio is in the above-mentioned range, shrinkage of the gray fabric occurring during the heat setting can be reduced. The overfeed ratio represents a ratio in percentage of the rate of the gray fabric being fed in the length direction (warp direction) at an entrance of the heat setting process against processing rate. For example, +2% of overfeed ratio means that when the processing rate of the heat setting is set to 30 m/min, 30.6 m of the gray fabric is fed to the heat setting device per minute by using an overfeed roller placed at an entrance of the heat setting device.

The drying temperature in the heat setting process is expected to be 120° C. or more, preferably 140° C. or more, more preferably 160° C. or more. Also, the drying temperature is expected to be 200° C. or less, preferably 190° C. or less, more preferably 180° C. or less. When the drying temperature is in the above-mentioned range, the airbag base fabric to be obtained is excellent in dimensional stability. When the drying temperature is less than 120° C., the dimensional stability tends to be reduced. On the other hand, when the drying temperature is more than 200° C., the airbag base fabric tends to have lower mechanical properties.

Also, when the above coating process is performed, the drying temperature in the heat setting process is preferably 160° C. or more, more preferably 170° C. or more. Also, the drying temperature is preferably 200° C. or less, more preferably 190° C. or less. When the drying temperature is in the above-mentioned range, the resin coated on the airbag base fabric to be obtained is sufficiently dried and the mechanical properties are less likely to be reduced.

A setting time of the heat setting process is not particularly limited. For example, the setting time is preferably 15 seconds or more, more preferably 30 seconds or more. Also, the setting time is preferably 120 seconds or less, more preferably 90 seconds or less. When the setting time of the heat setting process is in the above-mentioned range, sufficient dimensional stability is provided to the airbag base fabric to be obtained.

Therefore, according to the method of manufacturing the airbag base fabric, an airbag base fabric having the above-mentioned energy absorption characteristic can be obtained. An airbag sewn from such airbag base fabric can sufficiently absorb collision energy in various types of collisions. Therefore, the airbag is useful as a variety of airbags such as not only airbags for a driver's seat and a passenger seat coping with a frontal collision but also a knee airbag for protecting knees and a side airbag and a curtain airbag coping with a lateral collision. Especially, side airbags, as described above, need to function as a barrier preventing a deformed door and other things from hitting the occupant and, at the same time, function to receive motion of the occupant's part of waist and chest, and the required performance is quite demanding. Even when used as such side airbag, an airbag obtained from the airbag base fabric can not only function as a barrier, absorbing collision energy sufficiently, but also receive the occupant properly.

One example of my fabrics, airbags and methods have been explained so far. This disclosure is not particularly limited to the above example.

(1) An airbag base fabric having a warp direction energy absorption characteristic defined by formula (1) is 30 to 50 and a weft direction energy absorption characteristic defined by formula (2) is 30 to 50.

Warp Direction Energy Absorption Characteristic=Warp Direction Energy Absorption Amount/Warp Yarn Cover Factor    (1)

wherein the warp direction energy absorption amount is a value of the integral of stress applied, in measurement of the warp direction tensile strength and elongation at break, from the start of the measurement until the sample breaks, and Weft Direction Energy Absorption Characteristic=Weft Direction Energy Absorption Amount/Weft Yarn Cover Factor    (2)

wherein the weft direction energy absorption amount is a value of the integral of stress applied, in measurement of the weft direction tensile strength and elongation at break, from the start of the measurement until the sample breaks.

Both of the warp direction and weft direction energy absorption characteristics of the airbag base fabric are 30-50. The airbag sewn from this airbag base fabric can sufficiently absorb collision energy in various types of collisions.

(2) The airbag base fabric of (1), wherein a warp yarn and a weft yarn forming the airbag base fabric mentioned above are synthetic multifilament yarn, and the both has a total fineness of 145 to 720 dtex, a single filament fineness of 2 to 10 dtex, a tenacity of 4.5 to 6.5 cN/dtex, and a elongation at break of 23 to 45%.

The airbag obtained by sewing the airbag base fabric has low air permeability, and the inner pressure at deployment is appropriate, and mechanical properties with which an occupant can be protected without the sewn airbag being torn at airbag deployment can be obtained. Also, the airbag to be obtained is compact, but also can be largely deployed. Therefore, the material cost of the airbag base fabric can be reduced.

(3) The airbag base fabric of (1) or (2), wherein the average of the warp direction elongation at break and the weft direction elongation at break is 35 to 55%.

The amount of the materials used for the airbag base fabric is reduced and the cost can be reduced. Also, the base fabric of the airbag to be obtained appropriately stretches at deployment, and stress is less likely to concentrate at the time of receiving an occupant. Therefore, damage to the cushion of the airbag is reduced. The expression "damage to the cushion" includes damage such as scratching, tearing, making a hole of the airbag base fabric or its sewn part due to the inner pressure at deployment, hot gas, or the contact with an occupant or a vehicle body.

(4) The airbag base fabric of any one of (1) to (3), wherein the sum of the warp yarn cover factor and the weft yarn cover factor is 1900-2400.

The airbag obtained by sewing the airbag base fabric is excellent in the mechanical properties. Also, the airbag to be obtained has low air permeability, and its shape tends to be maintained at deployment.

(5) The airbag base fabric of any one of (1) to (4), wherein the average of the warp direction elongation at break and the weft direction elongation at break is 44 to 50%, and single filament fineness of the warp yarn and the weft yarn forming the airbag base fabric are both 3 to 7 dtex.

The airbag obtained by sewing the airbag base fabric is better in the mechanical properties. Also, the airbag to be obtained appropriately stretches at deployment and stress is less likely to concentrate at the time of receiving an occupant. Therefore, damage to the cushion of the airbag is further reduced. In addition, the airbag to be obtained is compact, but also can be more largely deployed. Consequently, the material cost of the airbag base fabric can be further reduced.

(6) An airbag, wherein the airbag base fabric of any one of claims (1) to (5) is sewn.

The airbag is formed of the above-mentioned airbag base fabric. Therefore, the airbag can sufficiently absorb collision energy in various types of collisions.

(7) The airbag of (6) used as a side airbag.

The airbag appropriately deploys especially in reaction to a frontal collision and absorb collision energy.

(8) A method of manufacturing the airbag base fabric of any one of (1) to (5) comprises a scouring process that scours a woven gray fabric by applying a tension of 150 to 400 N/m with water at 70° C. or less, a drying process that dries the gray fabric at a temperature of 140° C. or less, and a heat-setting process that heat-sets the woven gray fabric, wherein the heat-setting process is a process in which tentering is performed, by using a pin stenter dryer, to obtain a base fabric width more than 98% of a width of the gray fabric dried by a dryer, with an overfeed ratio of −2 to +2%, at a temperature of 120 to 200° C.

The airbag base fabric described above is manufactured. The airbag sewn from this airbag base fabric can sufficiently absorb collision energy in various types of collisions.

EXAMPLE

My fabrics, airbags and methods, as noted above, are explained more specifically with examples below. This disclosure is not limited at all to the examples. Characteristics values are respectively calculated by the below methods.

Calculation Methods of Characteristic Values
Total Fineness of Raveled Yarn

To calculate the total fineness (dtex) of the raveled yarn in accordance with formula (5) based on JIS L 1096: 2010 8. 9. 1. 1 Method B, respectively five raveled yarns in the warp direction and the weft direction were collected from a sample (dimensions: 250 mm×250 mm) cut out from a central part of the airbag base fabric:

$$T = 10000 \times M/(1250 \times (1+Cw)) \tag{5}$$

wherein T is the total fineness (dtex) of the raveled yarn, M is a weight (mg) of five raveled yarns of the warp or the weft, and Cw is a crimp ratio, which is described below.

Single Filament Fineness of Raveled Yarn

The single filament fineness of the raveled yarn was calculated by dividing the total fineness of the raveled yarn by a filament count.

Filament Count

A filament count of the raveled yarn was calculated in accordance with the method of JIS L 1013 (2010) 8. 4.

Tenacity and Elongation at Break of Raveled Yarn

The tensile strength and the elongation at break of the raveled yarn were calculated in accordance with the constant-rate extension condition shown in the standard test specified in JIS L 1013: 2010 8. 5. 1. Specifically, for the measurement, the raveled yarn collected from a central portion of the base fabric was twisted 20 times/25 cm. A measuring instrument used was a tensile and compression tester (TENSILON UCT-100 manufactured by Orientec Co., Ltd.), with a gripping distance of 25 cm and a tension speed of 30 cm/min. The tenacity (cN/dtex) of the raveled yarn was calculated by dividing the obtained tenacity (cN) of the raveled yarn by the total fineness of the raveled yarn. Also, the elongation at break (%) was calculated based on the elongation at a point showing the maximum strength in the stress-strain curve obtained from the measurement.

Fabric Density of Airbag Base Fabric

The fabric density of the airbag base fabric was measured in accordance with JIS L 1096: 2010 8. 6. 1 Method A. Specifically, a specimen was placed on a flat table for removing unnatural creases and tension, and the numbers of the warp yarns and the weft yarns per 2.54 cm was counted at five different positions with a digital density measuring instrument (FX3250 manufactured by TEXTEST). An average value of each was calculated as the fabric density (number of threads/2.54 cm).

Crimp Ratio of Airbag Base Fabric

To obtain the crimp ratio of the airbag base fabric, in accordance with JIS L 1096: 2010 8. 7 Method B, a sample was cut out from a central portion of the airbag base fabric, an initial load (cN) was set by a calculation formula shown by formula (6), and the warp direction and weft direction crimp ratios (%) were calculated in accordance with a calculation formula shown by formula (7):

$$IG = T \times 0.1 \tag{6}$$

wherein IG is an initial load (cN), and T is the total fineness (dtex) of the raveled yarn.

$$Cw = 100 \times (L-200)/200 \tag{7}$$

wherein Cw is a crimp ratio (%) and L is a length (mm) measured with the initial load (IG) calculated by formula (6).

Total Weight of Airbag Base Fabric

To obtain the total weight of the airbag base fabric, in accordance with JIS L 1096: 2010 8. 3 Method A, at different three portions of the airbag base fabric, a sample (dimensions: 25 cm×25 cm) was made, a weight per square meter was calculated with an electronic balance, and an average value of those was obtained as the total weight (g/m$^2$).

Coating Amount of Resin on Airbag Base Fabric

To obtain the coating amount of resin, a portion to which resin coating was applied (a coated base fabric) and a portion to which resin coating was not applied (an uncoated base fabric) were made, and a value was obtained by subtracting a total weight of the uncoated base fabric from a total weight of the coated base fabric, as the coating amount (g/m$^2$).

Thickness of Airbag Base Fabric

To obtain the thickness of the airbag base fabric, in accordance with JIS L 1096: 2010 8. 5 Method A, at different five portions of the airbag base fabric, thickness was measured with a thickness measuring instrument (product name: ABS Digimatic Indicator ID-CX, manufactured by Mitutoyo Corporation., Ltd.) and a circular probe having a diameter of 1.05 cm after the airbag base fabric was held under a pressure of 1.0 kPa for 10 seconds to make the thickness thereof even, and an average value of those was calculated.

Tensile Strength and Elongation at Break of Airbag Base Fabric

The tensile strength and the elongation at break of the airbag base fabric were calculated in accordance with JIS L 1096: 2010 8. 14 Method A (the Strip Method). Specifically, at three different portions of the airbag base fabric, a sample piece (width: 40 mm, length: 300 mm) was made, and yarns were removed from the both edges in the width direction to adjust the width to 30 mm. A material testing instrument (Instron (registered trademark) 5965 manufactured by Instron Corp.) and an XL long travel contact-type extensometer (Model No. 2603 manufactured by Instron Corp.) were used so that the prepared sample piece was chucked with a grip distance of 150 mm, and, with the chucked 150-mm sample, the sample piece was set to the XL long travel contact-type extensometer with an interval of 100 mm. Testing was performed at a speed of 200 mm/min until the sample piece was broken, the stress at break was obtained each time, and an average value of those was calculated. Also, to obtain the elongation at break (%), an average value was calculated based on the elongation at a point showing the maximum strength in the "stress (N/mm$^2$)-strain (mm) (calculated by the XL long travel contact-type extensometer) curve." Then, to calculate an energy absorption amount, the data sampling interval was adjusted to 50 milliseconds, and data of the stress (N/mm$^2$) and the strain (mm) (calculated by the XL long travel contact-type extensometer) at each sampling were collected.

Energy Absorption Amount of Airbag Base Fabric

To obtain the energy absorption amount of the airbag base fabric, a micro area (N/mm) was calculated in accordance with formula (7) based on the data collected from the above measurement of the tensile strength and the elongation at break, and micro areas from the beginning of the measurement (the origin) to the break point were summed to calculate the energy absorption amount (N/mm). Average values in the warp and weft directions were calculated as the warp direction and weft direction energy absorption amounts.

$$\text{Micro Area}(N/\text{mm}) = (n+l\text{th Strain (mm)} - n\text{th Strain (mm)}) \times (n+l\text{th Stress})(N/\text{mm}^2) \quad (7)$$

wherein the nth is an arbitrary measurement point in time, and n+lth is a measurement point 50 milliseconds from the nth measurement point. Therefore, the n+lth strain is the degree of strain at the n+lth measurement point, and the n+lth stress is the degree of stress at the n+lth measurement point.

The obtained energy absorption amount was equivalent to an approximate value of the total sum (a value of integral) of the stress applied from the beginning of the measurement until the point where the sample piece breaks. In the example, because the measurement intervals were 50 milliseconds, being sufficiently short, this approximate value was used as the total sum of the stress (the energy absorption amount).

Tear Strength of Airbag Base Fabric

The tear strength of the airbag base fabric was calculated in accordance with JIS L 1096: 2010 8. 17 Method A. Specifically, to obtain the tear strength, sample pieces (dimensions: 15 cm×20 cm) were made out of three different portions of the airbag base fabric, and at a center of the short side (which was 7.5 cm away from the edges) a 10 cm cut perpendicular to the short cut was made. This sample was held by a material testing instrument (Instron (registered trademark, hereinafter the same) 5965 manufactured by Instron Corp.), using clamps which have 15 cm or more in width so that each slice (a portion where the above-mentioned cut was made (a portion of 7.5 cm×10 cm)) was perpendicular to the above and below clamps, and testing was performed at a tensile speed of 10 cm/min until 9 cm of the sample was torn. In the obtained stress-strain curve, a portion from the first peak to the ending of the test was divided into four sections, and, in the latter sections (the three-quarter part) except the first quarter, the average of the maximum points was calculated. This test was repeated three times, and an average value thereof was calculated as the tear strength (N). In this test method, a maximum point was a point where a more than 10% change was occurred from the previous concavity relative to the average stress in the above-mentioned latter sections (the three-quarter part).

Edgecomb Resistance of Airbag Base Fabric

To obtain the edgecomb resistance (N) of the airbag base fabric, in accordance with ASTM D 6479-02, sample pieces (dimensions: 30 cm×5 cm) were collected from different five portions of the airbag base fabric, measurements were made with a material testing instrument (Instron (registered trademark) 5965 manufactured by Instron Corp.), and an average value was calculated.

Stiffness of Airbag Base Fabric

The stiffness (N) of the airbag base fabric was calculated in accordance with the Circular Bend Method of ASTM D 4032-94.

Air Permeability of Airbag Base Fabric

To obtain the air permeability (static air permeability) of the airbag base fabric, in accordance with JIS L 1096: 2010 8.26 Method A (the Fragile Form Method), at different six portions of the airbag base fabric, an amount of air flowing through the airbag base fabric (L/cm$^2$/min) was calculated in a measurement area of 78.5 cm$^2$ under a differential pressure of 19.6 kPa, and an average value was calculated.

Cushion Diameter of Airbag

Figure 3:
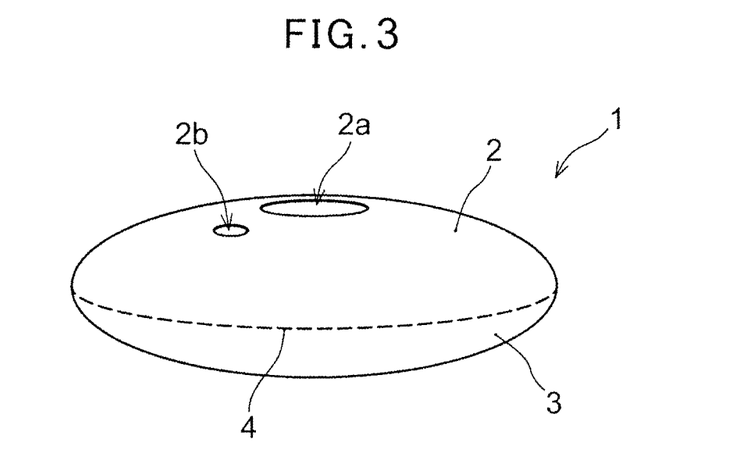
FIG. 3 is a schematic diagram of a cushion produced for evaluation of diameters of cushions in Examples and Comparative Examples.

The cushion was produced in the below method, and the cushion diameter of the airbag was calculated. FIG. 3 is a schematic diagram of a cushion 1 produced to calculate the characteristic value. Specifically, first, two circular samples having a diameter of 630 mm were cut out from the airbag base fabric by a punching method, and a hole 2a having a diameter of 90 mm was provided at a central portion of a circular sample 2, one of the circular samples, and a hole 2b having a diameter of 10 mm at any portion 20 mm away from the periphery of the hole 2a. Then, to produce a cushion, the circular sample 2 having a hole 2a and a circular sample 3 without a hole were put on top of each other so that the edges thereof were aligned and the warp directions make an angle of 45°, and the circumference of a 600 mm diameter was sewn by a sewing machine along a sewing line 4 in double chain stitch sewing, using a sewing thread in which three yarns of nylon 6.6 multifilament yarn having a total fineness of 470 dtex are doubled and twisted for both the needle thread and bobbin thread. Subsequently, the obtained cushion was turned inside out. From the hole 2a and the hole 2b, a pipe for pressure measurement having a diameter of 10 mm with a nut attached and a pipe for injection of compressed air having a diameter of 90 mm with a nut attached were inserted, the hole 2a and the hole 2b were closed by fasting nuts for each of the pipes, which had been placed inside the cushion 1 in advance, and then compressed air was injected. Subsequently, the largest diameter of the cushion 1 at the moment when the inner pressure reached 80 kPa was measured. It should be noted that the diameter of the cushion 1 was approximately 382 mm according to the calculation. However, due to the inner pressure, the actual diameter of the cushion can be larger in accordance with the warp direction and weft direction crimp ratio (%) of the sample. In addition, when an airbag base fabric having a large elongation at break was used, plastic deformation of a sample may occur, and the diameter of the cushion 1 may become larger. Therefore, by comparing the diameter of the cushion 1, 382 mm according to the calculations, with how much larger the actual cushion became, an amount of the airbag base fabric to be used to produce a cushion can be estimated.

Example 1

Preparation of Gray Fabric

For the warp yarn and the weft yarn, twistless synthetic multifilament yarn was prepared, comprising nylon 6,6 and having a single filament fineness of 3.5 dtex, a filament count of 136, a total fineness of 470 dtex, a tenacity of 5.8 cN/dtex, and a elongation at break of 42%. A water jet loom was used to weave a gray fabric having a warp density of 52.5 threads/2.54 cm and a weft density of 52.5 threads/2.54 cm.

Manufacturing Airbag Base Fabric

The obtained gray fabric was scoured with an open soaper type scouring machine. Scouring was performed under the following conditions: the water temperature of a scouring machine bath was 65° C.; the water temperature of a hot washing bath was 40° C.; and the tension in the warp direction was 200 N/m. Subsequently, the gray fabric was dried at a drying temperature of 120° C. Next, a pin stenter dryer was used, with the tentering ratio being set to have the same width as the dried gray fabric, for heat setting of the gray fabric for 60 seconds at a temperature of 180° C. under the dimensional regulation of the overfeed ratio of 0%. Characteristic values of the used raveled yarn and the obtained airbag base fabric are shown in Table 1.

Example 2

An airbag base fabric was produced in the same method as Example 1, except that a synthetic multifilament yarn having a tenacity of 6.0 cN/dtex and a elongation at break of 40% was used as the warp yarn and the weft yarn.

Comparative Example 1

An airbag base fabric was produced in the same method as Example 1, except that a synthetic multifilament yarn having a tenacity of 8.5 cN/dtex and a elongation at break of 23% was used as the warp yarn and the weft yarn.

Comparative Example 2

An airbag base fabric was produced in the same method as Example 1, except that the overfeed ratio for the heat setting process was changed to 5% and the tentering ratio to the width of the dried gray fabric was changed to 95%.

Comparative Example 3

An airbag base fabric was produced in the same method as Example 1, except that the overfeed ratio for the heat setting process was changed to −5% and the tentering ratio to the width of the dried gray fabric was changed to 105%.

Example 3

An airbag base fabric was produced in the same method as Example 1, except that the fabric density of both of the warp and the weft were changed to 49.5 threads/2.54 cm.

Comparative Example 4

An airbag base fabric was produced in the same method as Comparative Example 1, except that the fabric density of both of the warp and the weft were changed to 49.5 threads/2.54 cm.

Example 4

An airbag base fabric was produced in the same method as Example 1, except that the total fineness of the warp yarn and the weft yarn were changed to 350 dtex.

Comparative Example 5

An airbag base fabric was produced in the same method as Comparative Example 1, except that the total fineness of the warp yarn and the weft yarn were changed to 350 dtex.

Example 5

An airbag base fabric was produced in the same method as Example 3, except that the coating process was applied after the drying process for coating the dried gray fabric with solventless silicone resin so that the coating amount was 20 g/m², and the temperature for the heat setting process was changed to 200° C. A coating of the silicone resin was applied to the surface which would be the inside surface of a sewn airbag.

Comparative Example 6

An airbag base fabric was produced in the same method as Comparative Example 4, except that the coating process was applied after the drying process for coating the dried gray fabric with solventless type silicone resin so that the coating amount was 20 g/m², and the temperature for the heat setting process was changed to 200° C. A coating of the silicone resin was applied to the surface which would be the inside surface of a sewn airbag.

Example 6

An airbag base fabric was produced in the same method as Example 5, except that the fabric density of both of the warp and the weft were changed to 44.5 threads/2.54 cm.

Example 7

An airbag base fabric was produced in the same method as Example 1, except that the filament count of the warp yarn and the weft yarn were changed to 72.

Comparative Example 7

An airbag base fabric was produced in the same method as Comparative Example 1, except that the filament count of the warp yarn and the weft yarn were changed to 72.

Example 8

An airbag base fabric was produced in the same method as Example 1, except that the filament count of the warp yarn and the weft yarn were changed to 48.

Comparative Example 8

An airbag base fabric was produced in the same method as Comparative Example 1, except that the filament count of the warp yarn and the weft yarn were changed to 48.

Example 9

An airbag base fabric was produced in the same method as Example 1, except that the total fineness of the warp yarn and the weft yarn were changed to 175 dtex, the filament count of the warp yarn and the weft yarn were changed to 72, and the coating process was employed after the drying process for coating the dried gray fabric with solventless type silicone resin so that the coating amount was 15 g/m², and the temperature for the heat setting process was changed to 200° C. A coating of the silicone resin was applied to the surface which would be the inside surface of a sewn airbag.

Comparative Example 9

An airbag base fabric was produced in the same method as Example 4, except that, in the scouring process, the tension in the warp direction was changed to 500 N/m.

Comparative Example 10

An airbag base fabric was produced in the same method as Example 4, except that, in the heat setting process, the tentering ratio to the width of the dried gray fabric was changed to 95%.

Comparative Example 11

An airbag base fabric was produced in the same method as Example 4, except that, in the heat setting process, the tentering ratio to the width of the dried gray fabric was changed to 103%.

Comparative Example 12

An airbag base fabric was produced in the same method as Example 4, except that the temperature in the heat setting process was changed to 210° C.

Comparative Example 13

An airbag base fabric was produced in the same method as Example 4, except that the temperature in the scouring process was changed to 80° C.

Comparative Example 14

An airbag base fabric was produced in the same method as Comparative Example 1, except that the total fineness of the warp yarn and the weft yarn were changed to 175 dtex, the filament counts of the warp yarn and the weft yarn were changed to 72, and the coating process was adopted after the drying process for coating the dried gray fabric with solventless type silicone resin so that the coating amount was 15 g/m$^2$, and the temperature for the heat setting process was changed to 200° C. A coating of the silicone resin was applied to the surface which would be the inside surface of a sewn airbag.

Regarding Examples 1 to 9 and Comparative Examples 1 to 14, characteristic values of the used raveled yarns and the obtained airbag base fabrics are shown in Tables 1 or 2.

TABLE 1

| | Ex. 1 | Ex. 2 | Com. Ex. 1 | Com. Ex. 2 | Com. Ex. 3 | Ex. 3 |
|---|---|---|---|---|---|---|
| Manufacturing conditions | | | | | | |
| Scouring process | | | | | | |
| Temperature (° C.) | 65 | 65 | 65 | 65 | 65 | 65 |
| Tension (N/m) | 200 | 200 | 200 | 200 | 200 | 200 |
| Drying process | | | | | | |
| Temperature (° C.) | 120 | 120 | 120 | 120 | 120 | 120 |
| Heat setting process | | | | | | |
| Temperature (° C.) | 180 | 180 | 180 | 180 | 180 | 180 |
| Overfeed ratio (%) | 0 | 0 | 0 | 5 | −3 | 0 |
| Tentering ratio (%) | 100 | 100 | 100 | 95 | 103 | 100 |
| Raveled yarn | | | | | | |
| Total fineness (dtex) | | | | | | |
| Warp yarn | 475 | 475 | 475 | 482 | 466 | 475 |
| Weft yarn | 473 | 473 | 473 | 483 | 463 | 473 |
| Filament count | | | | | | |
| Warp yarn | 136 | 136 | 136 | 136 | 136 | 136 |
| Weft yarn | 136 | 136 | 136 | 136 | 136 | 136 |
| Single filament fineness (dtex) | | | | | | |
| Warp yarn | 3.5 | 3.5 | 3.5 | 3.5 | 3.4 | 3.5 |
| Weft yarn | 3.5 | 3.5 | 3.5 | 3.6 | 3.4 | 3.5 |
| Tenacity (cN/dtex) | | | | | | |
| Warp yarn | 5.4 | 5.6 | 7.9 | 5 | 5.7 | 5.4 |
| Weft yarn | 5.6 | 5.8 | 8.1 | 5.1 | 5.7 | 5.6 |
| Elongation at break (%) | | | | | | |
| Warp yarn | 36.8 | 33.7 | 20.8 | 34.8 | 28.8 | 37.0 |
| Weft yarn | 36.9 | 34.0 | 20.7 | 34.5 | 29.6 | 37.3 |
| Base fabric for airbag | | | | | | |
| Fabric density (number of threads/2.54 cm) | | | | | | |
| Warp yarn | 53 | 53 | 53 | 55 | 52 | 50 |
| Weft yarn | 53 | 53 | 53 | 55 | 52 | 50 |
| Cover factor | | | | | | |
| Warp yarn | 1096 | 1096 | 1096 | 1146 | 1065 | 1034 |
| Weft yarn | 1094 | 1094 | 1094 | 1147 | 1061 | 1032 |
| Total cover factor | 2189 | 2189 | 2189 | 2292 | 2126 | 2065 |
| Thickness (mm) | 0.31 | 0.31 | 0.31 | 0.33 | 0.30 | 0.31 |
| Total weight (g/m$^2$) | 215 | 215 | 215 | 221 | 209 | 215 |
| Coating amount (g/m$^2$) | — | — | — | — | — | — |

TABLE 1-continued

|  | | | | | | |
|---|---|---|---|---|---|---|
| Tensile strength (N/30 mm) | | | | | | |
| Warp direction | 1702 | 1972 | 2163 | 1552 | 1811 | 1606 |
| Weft direction | 1719 | 1995 | 2300 | 1569 | 1877 | 1622 |
| Elongation at break (%) | | | | | | |
| Warp direction | 48 | 45 | 33 | 51 | 38 | 47 |
| Weft direction | 42 | 39 | 27 | 44 | 34 | 42 |
| Average | 45 | 42 | 30 | 48 | 36 | 45 |
| Base fabric for airbag Energy absorption amount (N/m) | | | | | | |
| Warp direction | 40349 | 36477 | 27655 | 30111 | 30566 | 36314 |
| Weft direction | 46827 | 42044 | 30677 | 35210 | 34881 | 42144 |
| Energy absorption characteristic | | | | | | |
| Warp direction | 37 | 33 | 25 | 26 | 29 | 35 |
| Weft direction | 43 | 38 | 28 | 31 | 33 | 41 |
| Tear strength (N) | | | | | | |
| Warp direction | 123 | 125 | 174 | 110 | 112 | 136 |
| Weft direction | 119 | 122 | 170 | 105 | 100 | 137 |
| Edgecomb resistance (N) | | | | | | |
| Warp direction | 753 | 752 | 756 | 669 | 788 | 438 |
| Weft direction | 581 | 575 | 580 | 481 | 612 | 375 |
| Stiffness (N) | | | | | | |
| Warp direction | 16 | 16 | 21 | 24 | 18 | 14 |
| Weft direction | 16 | 17 | 21 | 25 | 19 | 13 |
| Crimp ratio (%) | | | | | | |
| Warp direction | 8 | 8.1 | 8 | 12.2 | 6.5 | 7 |
| Weft direction | 2.1 | 2.1 | 2.1 | 5.1 | 1.5 | 1.9 |
| Average | 5.1 | 5.1 | 5.1 | 8.7 | 4.0 | 4.5 |
| Air permeability (L/mm²/min) | 1.1 | 1.1 | 1.1 | 1.6 | 0.7 | 1.5 |
| Diameter of cushion, with an estimated diameter in parentheses (cm) | 44 (40) | 42 (40) | 40 (40) | 46 (42) | 41 (40) | 44 (40) |

|  | Com. Ex. 4 | Ex. 4 | Com. Ex. 5 | Ex. 5 | Com. Ex. 6 | Ex. 6 |
|---|---|---|---|---|---|---|
| Manufacturing conditions Scouring process | | | | | | |
| Temperature (° C.) | 65 | 65 | 65 | 65 | 65 | 65 |
| Tension (N/m) | 200 | 200 | 200 | 200 | 200 | 200 |
| Drying process | | | | | | |
| Temperature (° C.) | 120 | 120 | 120 | 120 | 120 | 120 |
| Heat setting process | | | | | | |
| Temperature (° C.) | 180 | 180 | 180 | 200 | 200 | 200 |
| Overfeed ratio (%) | 0 | 0 | 0 | 0 | 0 | 0 |
| Tentering ratio (%) | 100 | 100 | 100 | 100 | 100 | 100 |
| Raveled yarn Total fineness (dtex) | | | | | | |
| Warp yarn | 475 | 359 | 359 | 475 | 475 | 474 |
| Weft yarn | 473 | 357 | 357 | 473 | 473 | 474 |
| Filament count | | | | | | |
| Warp yarn | 136 | 136 | 136 | 136 | 136 | 136 |
| Weft yarn | 136 | 136 | 136 | 136 | 136 | 136 |
| Single filament fineness (dtex) | | | | | | |
| Warp yarn | 3.5 | 2.6 | 2.6 | 3.5 | 3.5 | 3.5 |
| Weft yarn | 3.5 | 2.6 | 2.6 | 3.5 | 3.5 | 3.5 |
| Tenacity (cN/dtex) | | | | | | |
| Warp yarn | 7.9 | 5.4 | 7.9 | 5.4 | 7.9 | 5.4 |
| Weft yarn | 8.1 | 5.6 | 8.1 | 5.6 | 8.1 | 5.6 |
| Elongation at break (%) | | | | | | |
| Warp yarn | 18.8 | 35.8 | 18.2 | 34.1 | 21.0 | 31.1 |
| Weft yarn | 21.0 | 35.8 | 20.7 | 34.4 | 20.8 | 32.5 |

TABLE 1-continued

| Base fabric for airbag Fabric density (number of threads/2.54 cm) | | | | | | |
|---|---|---|---|---|---|---|
| Warp yarn | 50 | 60 | 60 | 50 | 50 | 45 |
| Weft yarn | 50 | 60 | 60 | 50 | 50 | 45 |
| Cover factor | | | | | | |
| Warp yarn | 1034 | 1078 | 1078 | 1034 | 1034 | 929 |
| Weft yarn | 1032 | 1075 | 1075 | 1032 | 1032 | 929 |
| Total cover factor | 2065 | 2154 | 2154 | 2065 | 2065 | 1859 |
| Thickness (mm) | 0.31 | 0.29 | 0.29 | 0.31 | 0.31 | 0.28 |
| Total weight (g/m$^2$) | 215 | 180 | 180 | 235 | 235 | 201 |
| Coating amount (g/m$^2$) | — | — | — | 20 | 20 | 20 |
| Tensile strength (N/30 mm) | | | | | | |
| Warp direction | 2168 | 1458 | 1819 | 1801 | 2093 | 1523 |
| Weft direction | 2185 | 1528 | 2001 | 1822 | 2186 | 1550 |
| Elongation at break (%) | | | | | | |
| Warp direction | 30 | 49 | 33 | 42 | 30 | 38 |
| Weft direction | 27 | 42 | 27 | 41 | 29 | 41 |
| Average | 29 | 46 | 30 | 42 | 30 | 40 |
| Base fabric for airbag Energy absorption amount (N/m) | | | | | | |
| Warp direction | 26890 | 32311 | 23219 | 39229 | 29819 | 28559 |
| Weft direction | 27609 | 37033 | 26483 | 40687 | 30451 | 30418 |
| Energy absorption characteristic | | | | | | |
| Warp direction | 26 | 30 | 22 | 38 | 29 | 31 |
| Weft direction | 27 | 34 | 25 | 39 | 30 | 33 |
| Tear strength (N) | | | | | | |
| Warp direction | 189 | 110 | 147 | 202 | 280 | 255 |
| Weft direction | 190 | 117 | 160 | 212 | 300 | 248 |
| Edgecomb resistance (N) | | | | | | |
| Warp direction | 440 | 658 | 677 | 670 | 670 | 222 |
| Weft direction | 372 | 544 | 546 | 590 | 595 | 201 |
| Stiffness (N) | | | | | | |
| Warp direction | 16 | 7 | 10 | 9 | 11 | 5 |
| Weft direction | 17 | 9 | 19 | 10 | 12 | 4 |
| Crimp ratio (%) | | | | | | |
| Warp direction | 7.1 | 10 | 10.4 | 4.7 | 4.7 | 2.6 |
| Weft direction | 1.9 | 2.2 | 2.2 | 4 | 4.1 | 3.1 |
| Average | 4.5 | 6.1 | 6.3 | 4.4 | 4.4 | 2.9 |
| Air permeability (L/mm$^2$/min) | 1.4 | 1.6 | 1.6 | 0.0 | 0.0 | 0.0 |
| Diameter of cushion, with an estimated diameter in parentheses (cm) | 40 (40) | 44 (41) | 41 (41) | 43 (40) | 40 (40) | 41 (39) |

TABLE 2

| | Ex. 7 | Com. Ex. 7 | Ex. 8 | Com. Ex. 8 | Ex. 9 | Com. Ex. 9 |
|---|---|---|---|---|---|---|
| Manufacturing conditions Scouring process | | | | | | |
| Temperature (° C.) | 65 | 65 | 65 | 65 | 65 | 65 |
| Tension (N/m) | 200 | 200 | 200 | 200 | 200 | 500 |
| Drying process | | | | | | |
| Temperature (° C.) | 120 | 120 | 120 | 120 | 120 | 120 |
| Heat setting process | | | | | | |
| Temperature (° C.) | 180 | 180 | 180 | 180 | 200 | 180 |
| Overfeed ratio (%) | 0 | 0 | 0 | 0 | 0 | 0 |
| Tentering ratio (%) | 100 | 100 | 100 | 100 | 100 | 100 |

TABLE 2-continued

| | | | | | | |
|---|---|---|---|---|---|---|
| Raveled yarn Total fineness (dtex) | | | | | | |
| Warp yarn | 475 | 475 | 475 | 475 | 184 | 475 |
| Weft yarn | 473 | 473 | 473 | 473 | 184 | 473 |
| Filament count | | | | | | |
| Warp yarn | 72 | 72 | 48 | 48 | 72 | 48 |
| Weft yarn | 72 | 72 | 48 | 48 | 72 | 48 |
| Single filament fineness (dtex) | | | | | | |
| Warp yarn | 6.6 | 6.6 | 9.9 | 9.9 | 2.6 | 9.9 |
| Weft yarn | 6.6 | 6.6 | 9.9 | 9.9 | 2.6 | 9.9 |
| Tenacity (cN/dtex) | | | | | | |
| Warp yarn | 5.2 | 7.7 | 5 | 7.4 | 5.2 | 4.8 |
| Weft yarn | 5.4 | 7.9 | 5.3 | 7.7 | 5.3 | 5.3 |
| Elongation at break (%) | | | | | | |
| Warp yarn | 35.3 | 21.9 | 34.9 | 20.1 | 34.5 | 32.7 |
| Weft yarn | 33.9 | 18.7 | 31.0 | 16.5 | 33.3 | 32.0 |
| Base fabric for airbag Fabric density (number of threads/2.54 cm) | | | | | | |
| Warp yarn | 52.5 | 53 | 53 | 53 | 83 | 53.5 |
| Weft yarn | 52.5 | 53 | 53 | 53 | 83 | 52.5 |
| Cover factor | | | | | | |
| Warp yarn | 1085 | 1096 | 1096 | 1096 | 1068 | 1106 |
| Weft yarn | 1083 | 1094 | 1094 | 1094 | 1068 | 1083 |
| Total cover factor | 2169 | 2189 | 2189 | 2189 | 2136 | 2189 |
| Thickness (mm) | 0.31 | 0.31 | 0.31 | 0.31 | 0.19 | 0.31 |
| Total weight (g/m$^2$) | 215 | 215 | 215 | 215 | 144 | 215 |
| Coating amount (g/m$^2$) | — | — | — | — | 15 | — |
| Tensile strength (N/30 mm) | | | | | | |
| Warp direction | 1622 | 2048 | 1552 | 1892 | 1182 | 1582 |
| Weft direction | 1604 | 2186 | 1549 | 2117 | 1196 | 1494 |
| Elongation at break (%) | | | | | | |
| Warp direction | 44 | 31 | 42 | 29 | 44 | 40 |
| Weft direction | 40 | 26 | 38 | 24 | 39 | 39 |
| Average | 42 | 29 | 40 | 27 | 42 | 40 |
| Base fabric for airbag Energy absorption amount (N/m) | | | | | | |
| Warp direction | 35749 | 21662 | 32699 | 18363 | 33545 | 31332 |
| Weft direction | 42368 | 23858 | 35521 | 20330 | 36124 | 36301 |
| Energy absorption characteristic | | | | | | |
| Warp direction | 33 | 20 | 30 | 17 | 31 | 28 |
| Weft direction | 39 | 22 | 32 | 19 | 34 | 34 |
| Tear strength (N) | | | | | | |
| Warp direction | 170 | 236 | 123 | 171 | 168 | 119 |
| Weft direction | 163 | 226 | 136 | 189 | 188 | 142 |
| Edgecomb resistance (N) | | | | | | |
| Warp direction | 280 | 279 | 376 | 377 | 394 | 356 |
| Weft direction | 270 | 270 | 350 | 340 | 387 | 343 |
| Stiffness (N) | | | | | | |
| Warp direction | 20 | 22 | 22 | 24 | 4 | 22 |
| Weft direction | 19 | 23 | 21 | 22 | 4 | 20 |
| Crimp ratio (%) | | | | | | |
| Warp direction | 5.1 | 5 | 4.7 | 4.9 | 5.2 | 4.1 |
| Weft direction | 3.5 | 3.5 | 3.5 | 3.5 | 3.7 | 3.8 |
| Average | 4.3 | 4.3 | 4.1 | 4.2 | 4.5 | 4.0 |
| Air permeability (L/mm$^2$/min) | 3.1 | 3.2 | 7.1 | 7.1 | 0.0 | 6.7 |
| Diameter of cushion, with an estimated diameter in parentheses (cm) | 43 (40) | 40 (40) | 43 (40) | 40 (40) | 43 (40) | 42 (40) |

TABLE 2-continued

|  | Com. Ex. 10 | Com. Ex. 11 | Com. Ex. 12 | Com. Ex. 13 | Com. Ex. 14 |
| --- | --- | --- | --- | --- | --- |
| Manufacturing conditions Scouring process | | | | | |
| Temperature (° C.) | 65 | 65 | 65 | 80 | 65 |
| Tension (N/m) | 200 | 200 | 200 | 200 | 200 |
| Drying process | | | | | |
| Temperature (° C.) | 120 | 120 | 120 | 120 | 120 |
| Heat setting process | | | | | |
| Temperature (° C.) | 180 | 180 | 210 | 180 | 200 |
| Overfeed ratio (%) | 0 | 0 | 0 | 0 | 0 |
| Tentering ratio (%) | 95 | 103 | 100 | 100 | 100 |
| Raveled yarn Total fineness (dtex) | | | | | |
| Warp yarn | 475 | 475 | 475 | 480 | 185 |
| Weft yarn | 480 | 463 | 473 | 479 | 183 |
| Filament count | | | | | |
| Warp yarn | 48 | 48 | 48 | 48 | 72 |
| Weft yarn | 48 | 48 | 48 | 48 | 72 |
| Single filament fineness (dtex) | | | | | |
| Warp yarn | 9.9 | 9.9 | 9.9 | 9.9 | 2.6 |
| Weft yarn | 10.0 | 9.6 | 9.9 | 9.9 | 2.5 |
| Tenacity (cN/dtex) | | | | | |
| Warp yarn | 5 | 4.9 | 4.5 | 4.8 | 7.8 |
| Weft yarn | 5.1 | 5.3 | 4.8 | 5.1 | 8.1 |
| Elongation at break (%) | | | | | |
| Warp yarn | 33.8 | 34.1 | 31.8 | 32.3 | 18.7 |
| Weft yarn | 32.5 | 25.6 | 30.1 | 29.5 | 20.4 |
| Base fabric for airbag Fabric density (number of threads/2.54 cm) | | | | | |
| Warp yarn | 54.5 | 52 | 53 | 54 | 83 |
| Weft yarn | 53 | 53.5 | 53 | 54 | 83 |
| Cover factor | | | | | |
| Warp yarn | 1127 | 1075 | 1096 | 1122 | 1071 |
| Weft yarn | 1102 | 1092 | 1094 | 1121 | 1065 |
| Total cover factor | 2228 | 2167 | 2189 | 2244 | 2136 |
| Thickness (mm) | 0.32 | 0.31 | 0.31 | 0.33 | 0.19 |
| Total weight (g/m$^2$) | 218 | 212 | 215 | 219 | 144 |
| Coating amount (g/m$^2$) | — | — | — | — | 15 |
| Tensile strength (N/30 mm) | | | | | |
| Warp direction | 1552 | 1501 | 1397 | 1461 | 1280 |
| Weft direction | 1377 | 1577 | 1394 | 1458 | 1418 |
| Elongation at break (%) | | | | | |
| Warp direction | 42 | 43 | 40 | 42 | 28 |
| Weft direction | 42 | 32 | 36 | 37 | 26 |
| Average | 42 | 38 | 38 | 40 | 27 |
| Base fabric for airbag Energy absorption amount (N/m) | | | | | |
| Warp direction | 33629 | 31322 | 28428 | 30993 | 19998 |
| Weft direction | 32010 | 30655 | 30969 | 33399 | 21576 |
| Energy absorption characteristic | | | | | |
| Warp direction | 30 | 29 | 26 | 28 | 19 |
| Weft direction | 29 | 28 | 28 | 30 | 20 |
| Tear strength (N) | | | | | |
| Warp direction | 113 | 119 | 109 | 158 | 200 |
| Weft direction | 138 | 128 | 118 | 160 | 233 |
| Edgecomb resistance (N) | | | | | |
| Warp direction | 388 | 422 | 344 | 355 | 387 |
| Weft direction | 351 | 390 | 326 | 341 | 345 |

TABLE 2-continued

| Stiffness (N) | | | | | |
|---|---|---|---|---|---|
| Warp direction | 23 | 24 | 24 | 25 | 6 |
| Weft direction | 21 | 24 | 23 | 23 | 7 |
| Crimp ratio (%) | | | | | |
| Warp direction | 4.7 | 4.9 | 4.7 | 5.3 | 5.1 |
| Weft direction | 4.9 | 3.1 | 3.5 | 4.1 | 3.8 |
| Average | 4.8 | 4.0 | 4.1 | 4.7 | 4.5 |
| Air permeability (L/mm²/min) | 7.8 | 6.0 | 7.5 | 8.0 | 0.0 |
| Diameter of cushion, with an estimated diameter in parentheses (cm) | 43 (40) | 41 (40) | 43 (40) | 44 (40) | 41 (41) |

As shown in Tables 1 or 2, I found that the airbag base fabrics manufactured in Examples 1 to 9 have warp direction and weft direction energy absorption characteristics of 30 to 50 and can sufficiently absorb collision energy. Also, these airbag base fabrics have low air permeability in addition to the above-mentioned energy absorption characteristics. Therefore, I found that airbags obtained by sewing these airbag base fabrics are excellent in occupant restraint performance at deployment. Especially, the airbag base fabrics manufactured in Examples 1 to 5, 7 and 8 showed suitable stiffness. Therefore, I found that an airbag cushion can be easily manufactured with these airbag base fabrics, and the cushion is excellent in workability for being folded and stored. In addition, these airbag base fabrics have suitable tear strengths. Therefore, I found that, with the airbag obtained by sewing these airbag base fabrics, tearing is less likely to occur even in a portion where stress is concentrated when the airbag receives an occupant, and the airbag is highly reliable. In addition, the airbags obtained by sewing these airbag base fabrics had larger cushion diameters at deployment than the diameters estimated in consideration of crimp ratio (40 cm in Examples 1 to 3, 5 and 7 to 9; 41 cm in Example 4; and 39 cm in Example 6). Therefore, I found that these airbag base fabrics are excellent in compactness, allowing cost reduction by reducing the amount of materials to be used.

On the other hand, what the results show is that, in the airbag base fabrics manufactured in Comparative Examples 1 to 14, at least one of the warp direction and weft direction energy absorption characteristics is out of the range of 30 to 50, and they are not able to absorb collision energy sufficiently. Especially, the airbags obtained by sewing the airbag base fabrics manufactured in Comparative Example 1, 4 to 8, and 14 had cushion diameters at deployment not different from the diameters estimated in consideration of crimp ratios (40 cm in Comparative Examples 1, 4, and 6 to 8; 41 cm in Comparative Examples 5 and 14). Therefore, these airbag base fabrics do not contribute to compactness and do not contribute to cost reduction by reducing the amount of materials to be used.

The invention claimed is:

1. An airbag base fabric comprising warp yarns and weft yarns and having a warp direction energy absorption characteristic of 30 to 50 as defined by a first formula and a weft direction energy absorption characteristic of 30 to 50 as defined by a second formula wherein the first formula is:

Warp Direction Energy Absorption Characteristic = Warp Direction Energy Absorption Amount/ Warp Yarn Cover Factor wherein the warp direction energy absorption amount is a value of the integral of a curve of stress applied vs strain, during a, measurement of the warp direction tensile strength and elongation at break, from a start of the measurement until a sample breaks; and wherein the second formula is:

Weft Direction Energy Absorption Characteristic = Weft Direction Energy Absorption Amount/Weft Yarn Cover Factor wherein the weft direction energy absorption amount is a value of the integral of a curve of stress applied vs strain, during a, measurement of the weft direction tensile strength and elongation at break, from the start of the measurement until a sample breaks.

2. The airbag base fabric of claim 1, wherein a warp yarn and a weft yarn forming the airbag base fabric are synthetic multifilament yarn, and both have
   a total fineness of 145 to 720 dtex,
   a single filament fineness of 2 to 10 dtex,
   a tenacity of 4.5 to 6.5 cN/dtex, and
   a elongation at break of 23 to 45%.

3. The airbag base fabric of claim 1, wherein an average of the warp direction elongation at break and the weft direction elongation at break is 35 to 55%.

4. The airbag base fabric of claim 1, wherein a sum of the warp yarn cover factor and the weft yarn cover factor is 1900 to 2400.

5. The airbag base fabric of claim 1, wherein an average of the warp direction elongation at break and the weft direction elongation at break is 44 to 50%, and single filament fineness of the warp yarn and the weft yarn forming the airbag base fabric are both 3 to 7 dtex.

6. An airbag, wherein the airbag base fabric of claim 1 is sewn.

7. A side airbag comprising the airbag of claim 6.

8. A method of manufacturing the airbag base fabric of claim 1, comprising:
   a scouring process that scours a woven gray fabric by applying a tension of 150 to 400 N/m with water at 70° C. or less,
   a drying process that dries the gray fabric at a temperature of 140° C. or less, and
   a heat-setting process that heat-sets the woven gray fabric, wherein the heat-setting process comprises performing tentering with a pin stenter dryer to obtain a base fabric width more than 98% of a width of the gray fabric dried by a dryer, with an overfeed ratio of −2 to +2%, at a temperature of 120 to 200° C.

* * * * *